United States Patent
Venkatram et al.

(10) Patent No.: US 11,829,813 B2
(45) Date of Patent: Nov. 28, 2023

(54) RECOGNIZING AND DISCOVERING NEW SERVICES PROVIDED BY A CLOUD SERVICE PROVIDER

(71) Applicant: VMWARE, INC., Palo Alto, CA (US)

(72) Inventors: Shyam Kasi Venkatram, Bangalore (IN); Madhan Sankar, Bangalore (IN); Ayushi Ghatt, Bhopal (IN); Amita Ranjan, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/827,828

(22) Filed: May 30, 2022

(65) Prior Publication Data
US 2023/0333923 A1    Oct. 19, 2023

(51) Int. Cl.
G06F 9/44    (2018.01)
G06F 9/54    (2006.01)
G06F 9/445    (2018.01)

(52) U.S. Cl.
CPC .......... *G06F 9/547* (2013.01); *G06F 9/44505* (2013.01)

(58) Field of Classification Search
CPC .......................................... G06F 9/547
USPC .......................................... 719/328
See application file for complete search history.

(56) References Cited

U.S. PATENT DOCUMENTS

| | | | |
|---|---|---|---|
| 10,867,209 B2 * | 12/2020 | Coven .............. | H04N 21/23418 |
| 11,023,301 B1 * | 6/2021 | Hornbeck ................. | G06F 8/63 |
| 11,656,972 B1 * | 5/2023 | Crossan .................. | G06F 16/00 717/131 |

* cited by examiner

*Primary Examiner* — Timothy A Mudrick (57) ABSTRACT

Metrics corresponding to services provided by a cloud service provider can be received via a first API responsive to queries specifying identifiers of the services. A configuration file can be maintained that includes mappings between the identifiers of the services and the metrics corresponding to the services. An identifier of a new service provided by the cloud service provider can be received via a second API. A mapping between the identifier of the new service and a metric corresponding to the new service can be received by the configuration file. The metric corresponding to the new service can be received via the first API responsive to a query specifying the identifier of the new service.

20 Claims, 5 Drawing Sheets

RECOGNIZING AND DISCOVERING NEW SERVICES PROVIDED BY A CLOUD SERVICE PROVIDER

RELATED APPLICATIONS

Benefit is claimed under 35 U.S.C. 119(a)-(d) to Foreign Application Serial No. 202241022460 filed in India entitled "RECOGNIZING AND DISCOVERING NEW SERVICES PROVIDED BY A CLOUD SERVICE PROVIDER", on Apr. 15, 2022, by VMware, Inc., which is herein incorporated in its entirety by reference for all purposes.

The present application is related in subject matter to U.S. patent application Ser. No. 17/827,803 which is incorporated herein by reference.

BACKGROUND

A data center is a facility that houses servers, data storage devices, and/or other associated components such as backup power supplies, redundant data communications connections, environmental controls such as air conditioning and/or fire suppression, and/or various security systems. A data center may be maintained by an information technology (IT) service provider. An enterprise may purchase data storage and/or data processing services from the provider in order to run applications that handle the enterprises' core business and operational data. The applications may be proprietary and used exclusively by the enterprise or made available through a network for anyone to access and use.

Virtual computing instances (VCIs) have been introduced to lower data center capital investment in facilities and operational expenses and reduce energy consumption. A VCI is a software implementation of a computer that executes application software analogously to a physical computer. VCIs have the advantage of not being bound to physical resources, which allows VCIs to be moved around and scaled to meet changing demands of an enterprise without affecting the use of the enterprise's applications. In a software defined data center, storage resources may be allocated to VCIs in various ways, such as through network attached storage (NAS), a storage area network (SAN) such as fiber channel and/or Internet small computer system interface (iSCSI), a virtual SAN, and/or raw device mappings, among others.

DETAILED DESCRIPTION

The term "virtual computing instance" (VCI) covers a range of computing functionality, such as virtual machines, virtual workloads, data compute nodes, clusters, and containers, among others. A virtual machine refers generally to an isolated user space instance, which can be executed within a virtualized environment. Other technologies aside from hardware virtualization can provide isolated user space instances, also referred to as data compute nodes, such as containers that run on top of a host operating system without a hypervisor or separate operating system and/or hypervisor kernel network interface modules, among others. Hypervisor kernel network interface modules are data compute nodes that include a network stack with a hypervisor kernel network interface and receive/transmit threads. The term "VCI" covers these examples and combinations of different types of data compute nodes, among others.

VCIs, in some embodiments, operate with their own guest operating systems on a host using resources of the host virtualized by virtualization software (e.g., a hypervisor, virtual machine monitor, etc.). The tenant (i.e., the owner of the VCI) can choose which applications to operate on top of the guest operating system. Some containers, on the other hand, are constructs that run on top of a host operating system without the need for a hypervisor or separate guest operating system. The host operating system can use name spaces to isolate the containers from each other and therefore can provide operating-system level segregation of the different groups of applications that operate within different containers. This segregation is akin to the VCI segregation that may be offered in hypervisor-virtualized environments that virtualize system hardware, and thus can be viewed as a form of virtualization that isolates different groups of applications that operate in different containers. Such containers may be more lightweight than VCIs. While the present disclosure refers to VCIs, the examples given could be any type of virtual object, including data compute node, including physical hosts, VCIs, non-VCI containers, virtual disks, and hypervisor kernel network interface modules. Embodiments of the present disclosure can include combinations of different types of data compute nodes.

VCIs can be created in a public cloud environment. The term public cloud refers to computing services (hereinafter referred to simply as "services") provided publicly over the Internet by a cloud service provider. One example of a cloud service provider is Microsoft Azure, though embodiments of the present disclosure are not so limited. A public cloud frond end refers to the user-facing part of the cloud computing architecture, such as software, user interface, and client-side devices. A public cloud backend refers to components of the cloud computing system, such as hardware, storage, management, etc., that allow the front end to function as desired. Some public cloud backends allow customers to rent VCIs on which to run their applications. Users can boot a VCI base image to configure VCIs therefrom. Users can create, launch, and terminate such VCIs as needed. Users can be charged, for example, for the time during which the VCI is in operation.

Services, as used herein, refers to services provided by a cloud service provider. Particular instances of services may be referred to herein as "service instances." Metrics can be collected for services by a monitoring platform for display (e.g., using one or more dashboards). A monitoring platform can deliver operations management with application-to-storage visibility across physical, virtual, and cloud infrastructures. One example of a monitoring platform is vRealize Operations (vROps), though embodiments of the present disclosure are not so limited.

Service monitoring by a monitoring platform can include continually scanning in order to troubleshoot any service using the metric data collected. A component of the monitoring platform referred to herein as an adapter can discover service instances and collect respective metrics for a configured cloud service provider account for display. The adapter can collect metrics for services by querying an API endpoint of the cloud service provider that publishes metrics on the cloud service provider's namespaces.

In previous approaches, when a cloud service provider introduces a new service in the market, the monitoring platform undergoes updating for monitoring the new service. Accommodating the new update requires code changes against each newly added service and release activities. If a cloud service provider introduces a new service named "publicIPAddresses," for example, then the monitoring platform needs to be modified by adding a new service jar released by the cloud service provider along with receptive code logic (post understanding the service and working model) in discovering this new service. This process of supporting newly-added services is time-consuming and the monitoring platform may not accommodate all the newly-added services in a single release. Previous approaches do not provide a generic mechanism other than modifying the code of the monitoring platform to discover newly introduced service instances by a cloud service provider.

Embodiments of the present disclosure allow end users to update an existing monitoring service instance or platform with the details of a new service to be monitored without modifying any code during runtime. In some embodiments, for instance, details about the new service can be fed into the monitoring platform through a simple configuration file in an extensible markup language (XML), a YAML, or a JavaScript Object Notation (JSON) format, for instance, without affecting the existing services during runtime. As embodiments herein are generic and allow customers to update the environment during runtime, the need for any separate release activity from the monitoring platform's standpoint is removed. Accordingly, the operation of the monitoring platform is improved, which in turn improves the management of the services provided by the cloud service provider.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. For example, 228 may reference element "28" in FIG. 2, and a similar element may be referenced as 928 in FIG. 9. Analogous elements within a Figure may be referenced with a hyphen and extra numeral or letter. Such analogous elements may be generally referenced without the hyphen and extra numeral or letter. For example, elements 116-1, 116-2, and 116-N in FIG. 1A may be collectively referenced as 116. As used herein, the designator "N", particularly with respect to reference numerals in the drawings, indicates that a number of the particular feature so designated can be included. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

Figure 1:
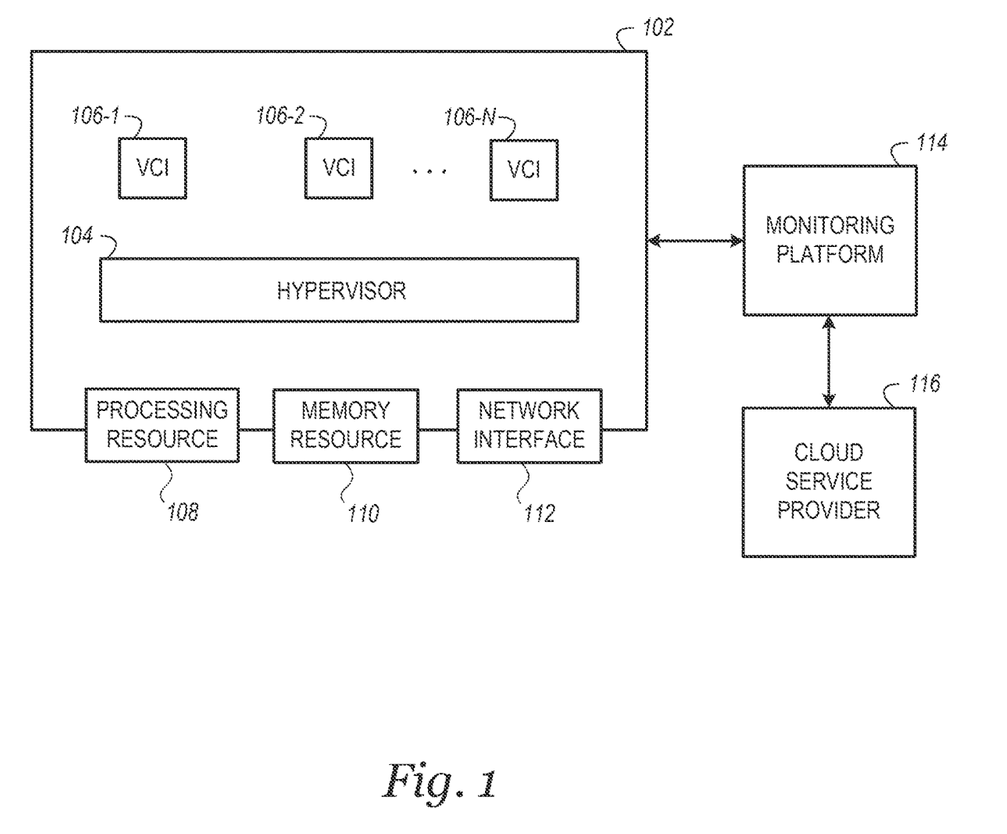
FIG. 1 is a diagram of a host and a system for recognizing and discovering new services provided by a cloud service provider according to one or more embodiments of the present disclosure.

FIG. 1 is a diagram of a host and a system for recognizing and discovering new services provided by a cloud service provider according to one or more embodiments of the present disclosure. The system can include a host 102 with processing resources 108 (e.g., a number of processors), memory resources 110, and/or a network interface 112. The host 102 can be included in a software defined data center. A software defined data center can extend virtualization concepts such as abstraction, pooling, and automation to data center resources and services to provide information technology as a service (ITaaS). In a software defined data center, infrastructure, such as networking, processing, and security, can be virtualized and delivered as a service. A software defined data center can include software defined networking and/or software defined storage. In some embodiments, components of a software defined data center can be provisioned, operated, and/or managed through an application programming interface (API).

The host 102 can incorporate a hypervisor 104 that can execute a number of virtual computing instances 106-1, 106-2, . . . , 106-N (referred to generally herein as "VCIs 106"). The VCIs can be provisioned with processing resources 108 and/or memory resources 110 and can communicate via the network interface 112. The processing resources 108 and the memory resources 110 provisioned to the VCIs can be local and/or remote to the host 102. For example, in a software defined data center, the VCIs 106 can be provisioned with resources that are generally available to the software defined data center and not tied to any particular hardware device. By way of example, the memory resources 110 can include volatile and/or non-volatile memory available to the VCIs 106. The VCIs 106 can be moved to different hosts (not specifically illustrated), such that a different hypervisor manages the VCIs 106. The host 102 can be in communication with a monitoring platform 114. An example of the monitoring platform is illustrated and described in more detail below. In some embodiments, the monitoring platform 114 can be a server, such as a web server. The monitoring platform 114 can be in communication with a cloud service provider 116. An example of the cloud service provider 116 is illustrated and described in more detail below.

Figure 2:
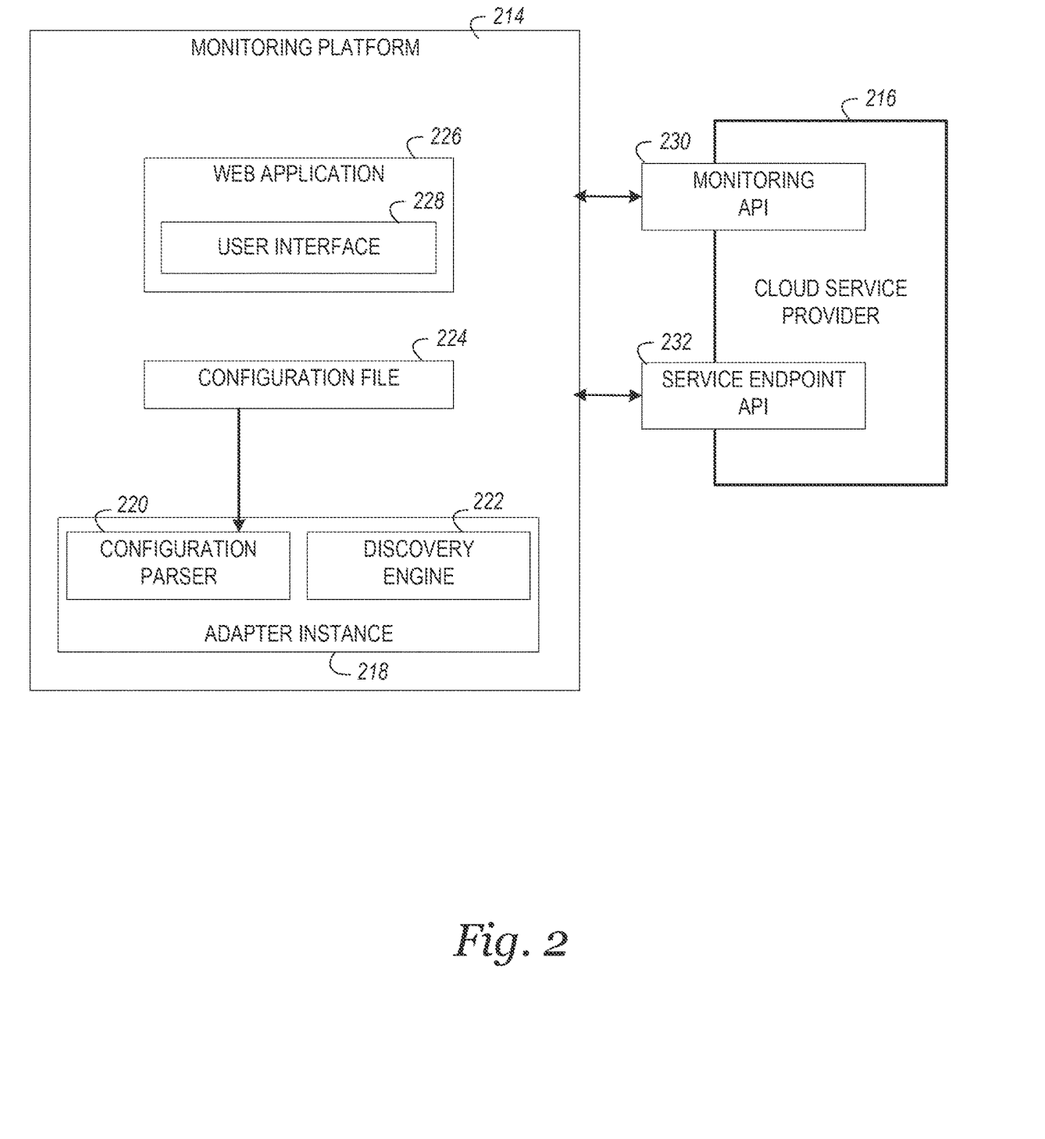
FIG. 2 is a diagram of a system for recognizing and discovering new services provided by a cloud service provider according to one or more embodiments of the present disclosure.

FIG. 2 is a diagram of a system for recognizing and discovering new services provided by a cloud service provider according to one or more embodiments of the present disclosure. As illustrated in FIG. 2, the system can include a monitoring platform 214 in communication with a cloud service provider 216. The monitoring platform can include an adapter instance 218, a web application 226, and a configuration file 224. The adapter instance 218 can include a configuration parser 220 and a discovery engine 222.

The cloud service provider 216 can expose the metrics of all service instances via a monitoring API 230. The monitoring platform 214 (e.g., the adapter instance 218 of the monitoring platform 214) can query the monitoring API periodically (e.g., using HTTP rest calls) for any metric related information. In some embodiments, a service endpoint API 232 can be used to receive service details from the monitoring platform 214. Once the metric information is gathered, then the discovery engine 222 can determine whether any service details (e.g., identifiers) in the configuration file 224 match service details received via the service endpoint API 232. If a metric from the cloud service provider is matched against a service detail in the configuration file 224, then an object or service instance corresponding to that service can be created by the web application 226 and displayed by the user interface 228.

An example of service details (metadata and metric) of an instance received for a an example Function App service "Microsoft.Web/serverFarms" that was newly introduced by the cloud service provider 216 and not yet supported by the monitoring platform 214 is:

```
{
    "id":       "/subscriptions/9452d17d-d90c-4a24-981c-
      b0d2beecb8b0/resourceGroups/AmitaResourceGroup/
      providers/Microsoft.Web/serverFarms/A SP-AmitaRe-
      sourceGroup-b7a1",
    "name": "ASP-AmitaResourceGroup-b5bc",
    "type": "Microsoft.Web/serverFarms",
    "sku": {
        "name": "Y1",
        "tier": "Dynamic", "size": "Y1",
        "family": "Y",
        "capacity": 0
    },
    "kind": "functionapp",
    "location": "centralus",
    "tags": { }
"Metrics": [
    "namespace": "Microsoft.Web/serverFarms",
    "resourceregion": "centralus"
    "value": [
    }
    "id":       "/subscriptions/9452d17d-d90c-4a24-981c-
      b0d2beecb8b0/resourceGroups/AmitaResourceGroup/
      providers/Microsoft.Web/serverFarms/A SP-AmitaRe-
      sourceGroup-b5bc/providers/Microsoft.      Insights/
      metrics/CpuPercentage",
"type": "Microsoft. Insights/metrics",
"name": {
    "value": "CpuPercentage",
    "localizedValue": "CPU Percentage"
},
"displayDescription": "The average CPU used across all instances of the plan.",
"unit": "Percent",
"timeseries": [
{
    "metadatavalues": [ ],
    "data": [
    {
        "timeStamp": "2021-11-12T08:00:00Z"
```

Here, the details of Namespace can be obtained from the "type" field. The "kind" field can include the metadata of the service instance. The metadata can include the name and/or identifier (id) of the instance. The "name" field can include the name of the metric. Once the metric details are extracted, the service discovery engine 222 can query this metric for service details, such as id or name, for instance, against the definitions provided in the configuration file 224. The portion of the configuration file 224 corresponding to the newly-created service can be:

```
<MappingDefinition namespace="Microsoft.Web/server-
    Farms" kind="functionapp">
<ResourceKindMapping
    resourceKind="AZURE_APP_SERVICE_PLAN"
    subscribedId="appServicePlan"
    isSecondClassService="false"/>
</ResourceKindMapping>
</MappingDefinition>
```

The path to the configuration file 224 in the monitoring platform 214 can be, for example, /usr/lib/vmware-vcops/user/plugins/inbound/conf/namespace-resourcekind-mappings.xml. Once the discovery engine 222 identifies the metric and its service type (Microsoft.Web/serverFarms: functionapp), then it can create a respective monitoring platform object attaching the metric information in it.

Figure 3:
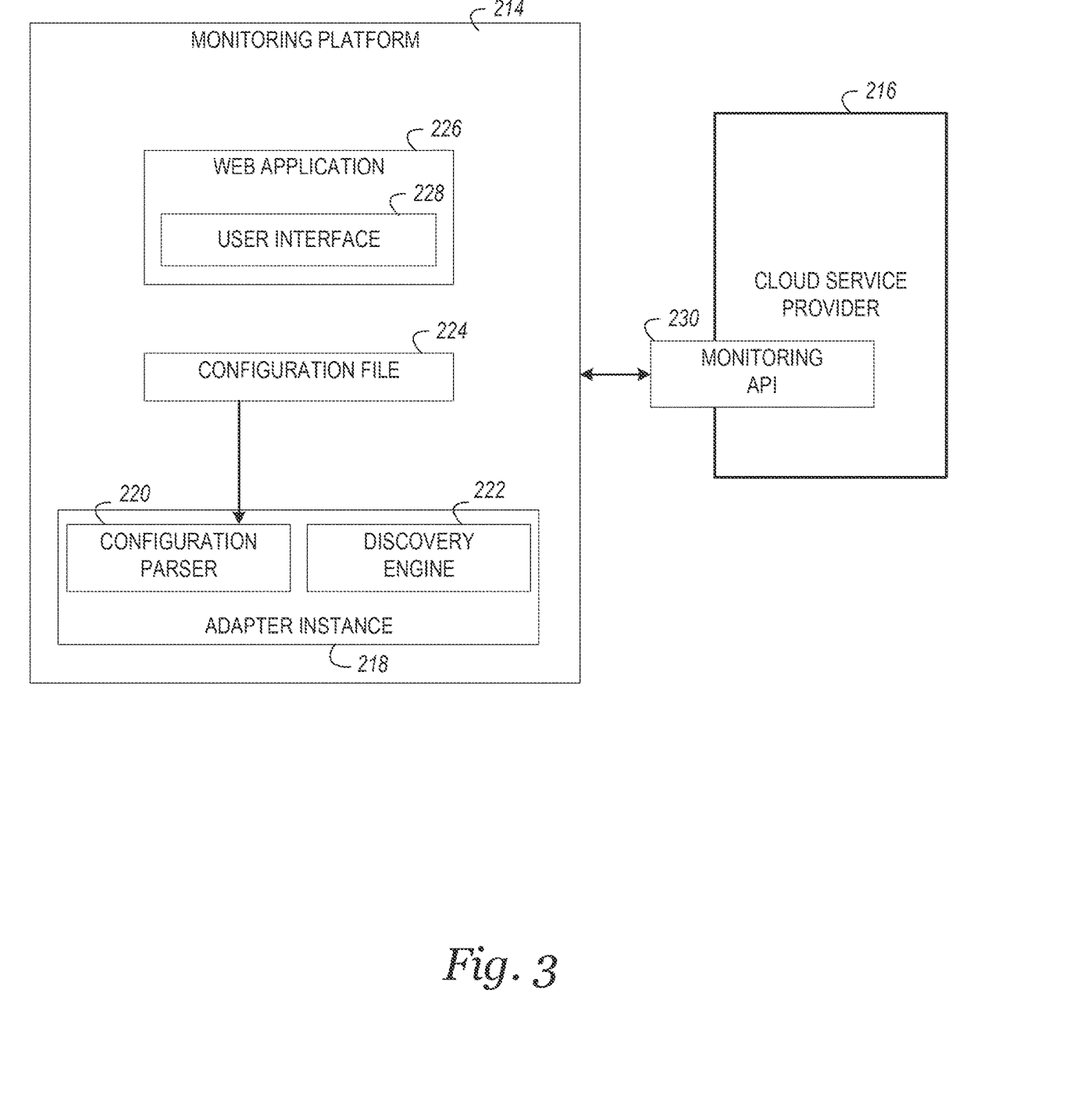
FIG. 3 is a diagram of a system for recognizing and discovering new services provided by a cloud service provider according to one or more embodiments of the present disclosure.

FIG. 3 is a diagram of a system for recognizing and discovering new services provided by a cloud service provider according to one or more embodiments of the present disclosure. FIG. 3 illustrates an example where metrics and service details are received via a same API. Stated differently, in some embodiments, a new service may be discovered based on received metrics rather than by service details received via a separate API. Such embodiments may include those where the cloud services provider 316 is a particular cloud services provider (e.g., AWS). As illustrated in FIG. 3, the system can include a monitoring platform 314 in communication with a cloud service provider 316. The monitoring platform can include an adapter instance 318, a web application 326, and a configuration file 324. The adapter instance 318 can include a configuration parser 320 and a discovery engine 322.

The cloud service provider 316 can expose the metrics of all service instances via a monitoring API 330. The monitoring platform 314 (e.g., the adapter instance 318 of the monitoring platform 214) can query the monitoring API periodically (e.g., using HTTP rest calls) for any metric related information. Once the metric information is gathered, then the discovery engine 322 can determine whether any service details (e.g., identifiers) in the configuration file 324 match service matching identifiers from the metrics received via the monitoring API 330. If a metric from the cloud service provider is matched against a service detail in the configuration file 324, then an object or service instance corresponding to that service can be created by the web application 326 and displayed by the user interface 328.

An example of metric of an instance received for an example service "Amazon MQ" that was newly introduced by the cloud service provider 316 and not yet supported by the monitoring platform 314 is:

```
{
  "Metrics": [
   {
     "Namespace": "AWS/AmazonMQ",
     "Dimensions": [
      {
        "Name": "Broker",
        "Value": "Dev-Broker-Instance-01"
      }
     ],
     "MetricName": "NetworkOut"
   },
   {
     "Namespace": " AWS/AmazonMQ",
     "Dimensions": [
      {
        "Name": "Broker",
        "Value": "Dev-Broker-Instance-01"
```

-continued

```
      }
   ],
   "MetricName": "CPUUtilization"
},
{
   "Namespace": " AWS/AmazonMQ",
   "Dimensions": [
      {
         "Name": "Broker",
         "Value": "Dev-Broker-Instance-01"
      }
   ],
   "MetricName": "NetworkIn"
},
...
]
}
```

Here, the details of Namespace can be obtained from the "Namespace" field. The "Dimensions" field can include the metadata of the service instance. The metadata can include the name and/or identifier (id) of the instance. The "MetricName" field can include the name of the metric. Once the metric details are extracted, the service discovery engine 322 can query this metric for service details, such as id or name, for instance, against the definitions provided in the configuration file 324. The portion of the configuration file 324 corresponding to the newly-created service can be:

```
<MappingDefinition namespace="AWS/ArnazonMQ">
   <ResourceKindMapping
         resourceKind="amazon_mq_broker"
         resourceName="Broker">
      <IdentifierMapping   dimensionKey="Broker"
         resourceIdentifier="broker_name"/>
   </ResourceKindMapping>
   <ResourceKindMapping
         resourceKind="amazon_mq_node"
         resourceName="Node">
      <IdentifierMapping   dimensionKey="Broker"
         resourceIdentifier="broker_name"/>
      <IdentifierMapping   dimensionKey="Node"
         resourceIdentifier="node_name"/>
   </ResourceKindMapping>
   <ResourceKindMapping
         resourceKind="amazon_mq_topic"
         resourceName="Topic">
      <IdentifierMapping   dimensionKey="Broker"
         resourceIdentifier="broker_name"/>
      <IdentifierMapping   dimensionKey="Topic"
         resourceIdentifier="topic_name"/>
   </ResourceKindMapping>
   <ResourceKindMapping
         resourceKind="amazon_mq_queue"
         resourceName="Queue">
      <IdentifierMapping   dimensionKey="Broker"
         resourceIdentifier="broker_name"/>
      <IdentifierMapping   dimensionKey="Queue"
         resourceIdentifier="queue_name"/>
   </ResourceKindMapping>
   <ResourceKindMapping
         resourceKind="amazon_mq_virtual_host"
         resourceName="VirtualHost">
      <IdentifierMapping   dimensionKey="Broker"
         resourceIdentifier="broker_name"/>
      <IdentifierMapping   dimensionKey="Queue"
         resourceIdentifier="queue_name"/>
      <IdentifierMapping
         dimensionKey="VirtualHost"resourceIdentifier=
         "virtual_host_name"/>
   </ResourceKindMapping>
</MappingDefinition>
```

The path to the configuration file 324 in the monitoring platform 314 can be, for example, /usr/lib/vmware-vcops/user/plugins/inbound/conf/namespace-resourcekind-mappings.xml. Once the discovery engine 322 identifies the metric and its service type (Amazon MQ Broker), then it can create a respective monitoring platform object attaching the metric information in it.

Figure 4:
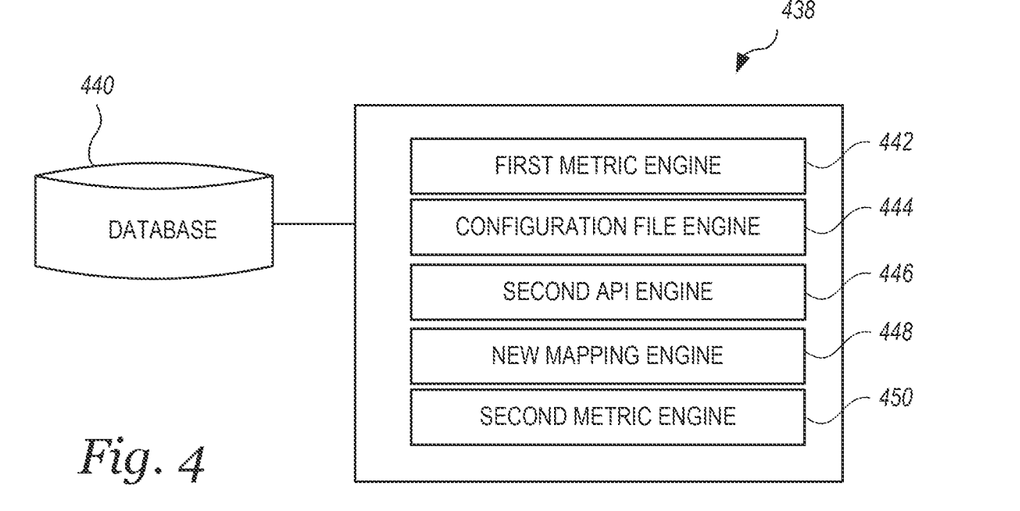
FIG. 4 is a diagram of a system for recognizing and discovering new services provided by a cloud service provider according to one or more embodiments of the present disclosure.

FIG. 4 is a diagram of a system 438 for recognizing and discovering new services provided by a cloud service provider according to one or more embodiments of the present disclosure. The system 438 can include a database 440 and/or a number of engines, for example first metric engine 442, configuration file engine 444, second API engine 446, new mapping engine 448 and/or second metric engine 450, and can be in communication with the database 440 via a communication link. The system 438 can include additional or fewer engines than illustrated to perform the various functions described herein. The system can represent program instructions and/or hardware of a machine (e.g., machine 552 as referenced in FIG. 5, etc.). As used herein, an "engine" can include program instructions and/or hardware, but at least includes hardware. Hardware is a physical component of a machine that enables it to perform a function. Examples of hardware can include a processing resource, a memory resource, a logic gate, an application specific integrated circuit, a field programmable gate array, etc.

The number of engines can include a combination of hardware and program instructions that is configured to perform a number of functions described herein. The program instructions (e.g., software, firmware, etc.) can be stored in a memory resource (e.g., machine-readable medium) as well as hard-wired program (e.g., logic). Hard-wired program instructions (e.g., logic) can be considered as both program instructions and hardware. In some embodiments, the first metric engine 442 can include a combination of hardware and program instructions that is configured to receive, via a first application programming interface (API), metrics corresponding to services provided by a cloud service provider responsive to queries specifying identifiers of the services. In some embodiments, the configuration file engine 444 can include a combination of hardware and program instructions that is configured to maintain a configuration file that includes mappings between the identifiers of the services and the metrics corresponding to the services. In some embodiments, the second API engine 446 can include a combination of hardware and program instructions that is configured to receive, via a second API, an identifier of a new service provided by the cloud service provider. In some embodiments, the new mapping engine 448 can include a combination of hardware and program instructions that is configured to receive, by the configuration file, a mapping between the identifier of the new service and a metric corresponding to the new service. In some embodiments, the second metric engine 450 can include a combination of hardware and program instructions that is configured to receive, via the first API, the metric corresponding to the new service responsive to a query specifying the identifier of the new service. Some embodiments include a display engine configured to display the metric corresponding to the new service via an object of a monitoring platform.

Figure 5:
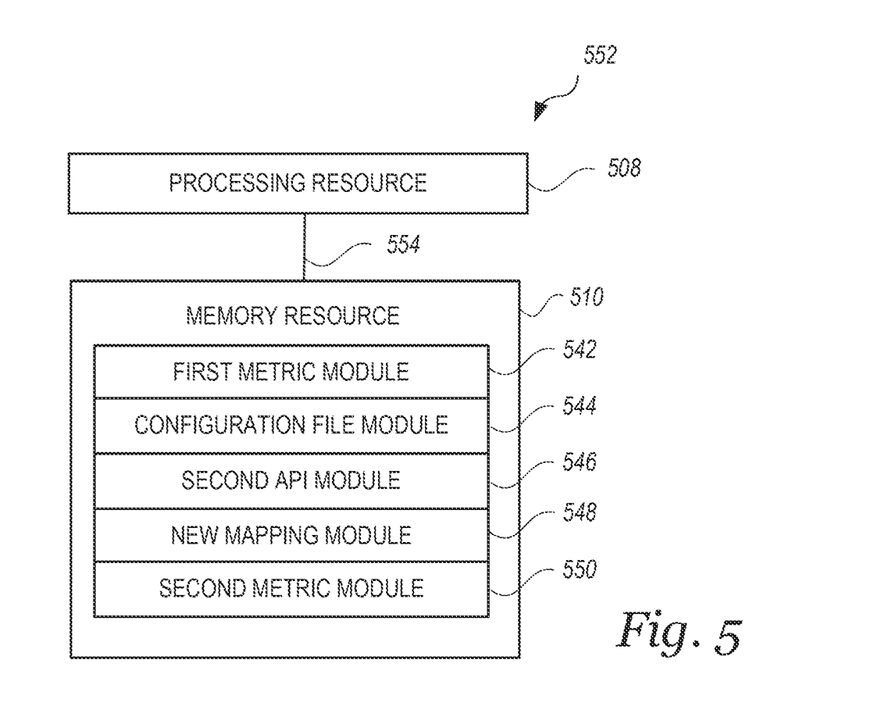
FIG. 5 is a diagram of a machine for recognizing and discovering new services provided by a cloud service provider according to one or more embodiments of the present disclosure.

FIG. 5 is a diagram of a machine for recognizing and discovering new services provided by a cloud service provider according to one or more embodiments of the present disclosure. The machine 552 can utilize software, hardware, firmware, and/or logic to perform a number of functions. The machine 552 can be a combination of hardware and program instructions configured to perform a number of functions (e.g., actions). The hardware, for example, can include a number of processing resources 508 and a number of memory resources 510, such as a machine-readable medium (MRM) or other memory resources 406. The memory resources 510 can be internal and/or external to the machine 552 (e.g., the machine 552 can include internal memory resources and have access to external memory resources). In some embodiments, the machine 552 can be a virtual computing instance (VCI). The program instructions (e.g., machine-readable instructions (MRI)) can include instructions stored on the MRM to implement a particular function (e.g., an action such as receiving metrics, as described herein). The set of MRI can be executable by one or more of the processing resources 508. The memory resources 510 can be coupled to the machine 552 in a wired and/or wireless manner. For example, the memory resources 510 can be an internal memory, a portable memory, a portable disk, and/or a memory associated with another resource, e.g., enabling MRI to be transferred and/or executed across a network such as the Internet. As used herein, a "module" can include program instructions and/or hardware, but at least includes program instructions.

Memory resources 510 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change memory (PCM), 3D cross-point, ferroelectric transistor random access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, magnetic memory, optical memory, and/or a solid state drive (SSD), etc., as well as other types of machine-readable media.

The processing resources 508 can be coupled to the memory resources 510 via a communication path 554. The communication path 554 can be local or remote to the machine 552. Examples of a local communication path 554 can include an electronic bus internal to a machine, where the memory resources 510 are in communication with the processing resources 508 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 554 can be such that the memory resources 510 are remote from the processing resources 508, such as in a network connection between the memory resources 510 and the processing resources 508. That is, the communication path 554 can be a network connection. Examples of such a network connection can include a local area network (LAN), wide area network (WAN), personal area network (PAN), and the Internet, among others.

As shown in FIG. 5, the MRI stored in the memory resources 510 can be segmented into a number of modules 542, 544, 546, 548, 550 that when executed by the processing resources 508 can perform a number of functions. As used herein a module includes a set of instructions included to perform a particular task or action. The number of modules 542, 544, 546, 548, 550 can be sub-modules of other modules. For example, the second metric module 550 can be a sub-module of the first metric module 542 and/or can be contained within a single module. Furthermore, the number of modules 542, 544, 546, 548, 550 can comprise individual modules separate and distinct from one another. Examples are not limited to the specific modules 542, 544, 546, 548, 550 illustrated in FIG. 5.

Each of the number of modules 542, 544, 546, 548, 550 can include program instructions and/or a combination of hardware and program instructions that, when executed by a processing resource 504, can function as a corresponding engine as described with respect to FIG. 4. For example, the first metric module 542 can include program instructions and/or a combination of hardware and program instructions that, when executed by a processing resource 504, can function as the first metric engine 442, though embodiments of the present disclosure are not so limited.

The machine 552 can include a first metric module 542, which can include instructions to receive, via a first application programming interface (API), metrics corresponding to services provided by a cloud service provider responsive to queries specifying identifiers of the services. The machine 552 can include a configuration file module 544, which can include instructions to maintain a configuration file that includes mappings between the identifiers of the services and the metrics corresponding to the services. The machine 552 can include a second API module 546, which can include instructions to receive, via a second API, an identifier of a new service provided by the cloud service provider.

The machine 552 can include a new mapping module 548, which can include instructions to receive, by the configuration file, a mapping between the identifier of the new service and a metric corresponding to the new service. Some embodiments include instructions to receive the mapping between the identifier of the new service and the metric corresponding to the new service during runtime. The machine 552 can include a second metric module 550, which can include instructions to receive, via the first API, the metric corresponding to the new service responsive to a query specifying the identifier of the new service. In some embodiments, the machine 552 includes instructions to display the metric corresponding to the new service via an object (e.g., a display object) of a monitoring platform.

Figure 6:
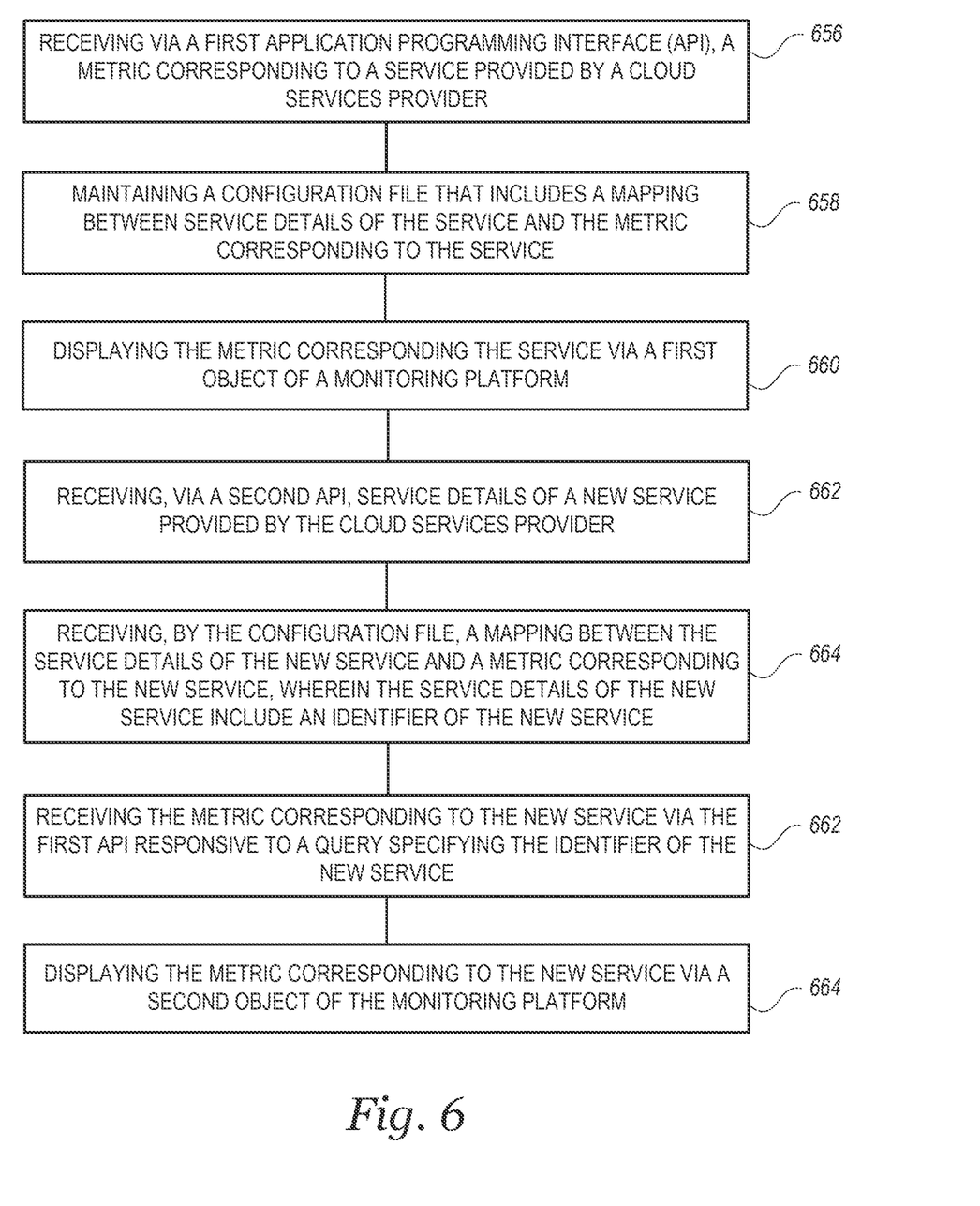
FIG. 6 illustrates a method of recognizing and discovering new services provided by a cloud service provider according to one or more embodiments of the present disclosure.

FIG. 6 illustrates a method of recognizing and discovering new services provided by a cloud service provider according to one or more embodiments of the present disclosure. At 656, the method includes receiving via a first application programming interface (API), a metric corresponding to a service provided by a cloud services provider. At 658, the method includes maintaining a configuration file that includes a mapping between service details of the service and the metric corresponding to the service. At 660, the method includes displaying the metric corresponding the service via a first object of a monitoring platform. At 662, the method includes receiving, via a second API, service details of a new service provided by the cloud services provider. At 664, the method includes receiving, by the configuration file, a mapping between the service details of the new service and a metric corresponding to the new service, wherein the service details of the new service include an identifier of the new service. The configuration file can be modified (e.g., updated) via user inputs, for instance. At 666, the method includes receiving the metric corresponding to the new service via the first API responsive to a query specifying the identifier of the new service. At 668, the method includes displaying the metric corresponding to the new service via a second object of the monitoring platform. The metric can be displayed using one or more monitoring platform dashboards known to those of skill in the art.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A non-transitory machine-readable medium having instructions stored thereon which, when executed by a processor, cause the processor to:
   receive, via a first application programming interface (API), metrics corresponding to services provided by a cloud service provider responsive to queries specifying identifiers of the services;
   maintain a configuration file that includes mappings between the identifiers of the services and the metrics corresponding to the services;
   receive, via a second API, an identifier of a new service provided by the cloud service provider;
   receive, by the configuration file, a mapping between the identifier of the new service and a metric corresponding to the new service; and
   receive, via the first API, the metric corresponding to the new service responsive to a query specifying the identifier of the new service.

2. The medium of claim 1, including instructions to display the metric corresponding to the new service via an object of a monitoring platform.

3. The medium of claim 1, including instructions to receive the mapping between the identifier of the new service and the metric corresponding to the new service during runtime.

4. The medium of claim 1, wherein the first API is a monitoring API and wherein the second API is a service endpoint API.

5. The medium of claim 1, wherein the configuration file is in an extensible markup language (XML).

6. The medium of claim 1, wherein the configuration file is in a YAML language.

7. The medium of claim 1, wherein the configuration file is in a JavaScript Object Notation (JSON) format.

8. The medium of claim 1, wherein the configuration file includes service details of the new service.

9. The medium of claim 8, wherein the service details include a type of the new service.

10. The medium of claim 8, wherein the service details include a kind of the new service.

11. A system, comprising:
    a first metric engine configured to receive, via a first application programming interface (API), metrics corresponding to services provided by a cloud service provider responsive to queries specifying identifiers of the services;
    a configuration file engine configured to maintain a configuration file that includes mappings between the identifiers of the services and the metrics corresponding to the services;
    a second API engine configured to receive, via a second API, an identifier of a new service provided by the cloud service provider;
    a new mapping engine configured to receive, by the configuration file, a mapping between the identifier of the new service and a metric corresponding to the new service; and
    a second metric engine configured to receive, via the first API, the metric corresponding to the new service responsive to a query specifying the identifier of the new service.

12. The system of claim 11, including a display engine configured to display the metric corresponding to the new service via an object of a monitoring platform.

13. The system of claim 11, wherein the new service is a web app service.

14. The system of claim 11, wherein the new service is a function.

15. A method, comprising:
    receiving via a first application programming interface (API), a metric corresponding to a service provided by a cloud services provider;
    maintaining a configuration file that includes a mapping between service details of the service and the metric corresponding to the service;
    displaying the metric corresponding the service via a first object of a monitoring platform;
    receiving, via a second API, service details of a new service provided by the cloud services provider;
    receiving, by the configuration file, a mapping between the service details of the new service and a metric corresponding to the new service, wherein the service details of the new service include an identifier of the new service;
    receiving the metric corresponding to the new service via the first API responsive to a query specifying the identifier of the new service; and
    displaying the metric corresponding to the new service via a second object of the monitoring platform.

16. The method of claim 15, wherein receiving, by the configuration file, the mapping between the service details of the new service and the metric corresponding to the new service includes receiving user inputs to the configuration file.

17. The method of claim 15, wherein displaying the metric corresponding to the new service via the second object of the monitoring platform includes displaying a dashboard.

18. The method of claim 15, wherein the new service is not supported by the monitoring platform before receiving the service details of the new service.

19. The method of claim 15, wherein the service details of the new service include a name of the metric corresponding to the new service.

20. The method of claim 15, wherein the method includes:
receiving, via the second API, service details of another new service provided by the cloud services provider;
receiving, by the configuration file, a mapping between the service details of the other new service and a metric corresponding to the other new service, wherein the service details of the other new service include an identifier of the other new service;
receiving the metric corresponding to the other new service via the first API responsive to a query specifying the identifier of the other new service; and
displaying the metric corresponding to the other new service via a third object of the monitoring platform.

* * * * *